Nov. 2, 1937.    E. L. DAILY    2,097,833
AUTOMOBILE SAFETY BUMPER
Filed Nov. 16, 1936    2 Sheets-Sheet 1
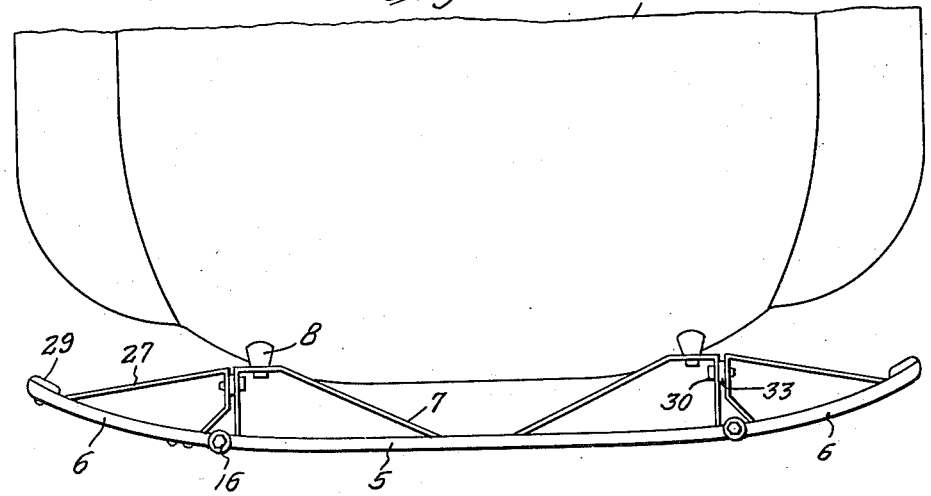
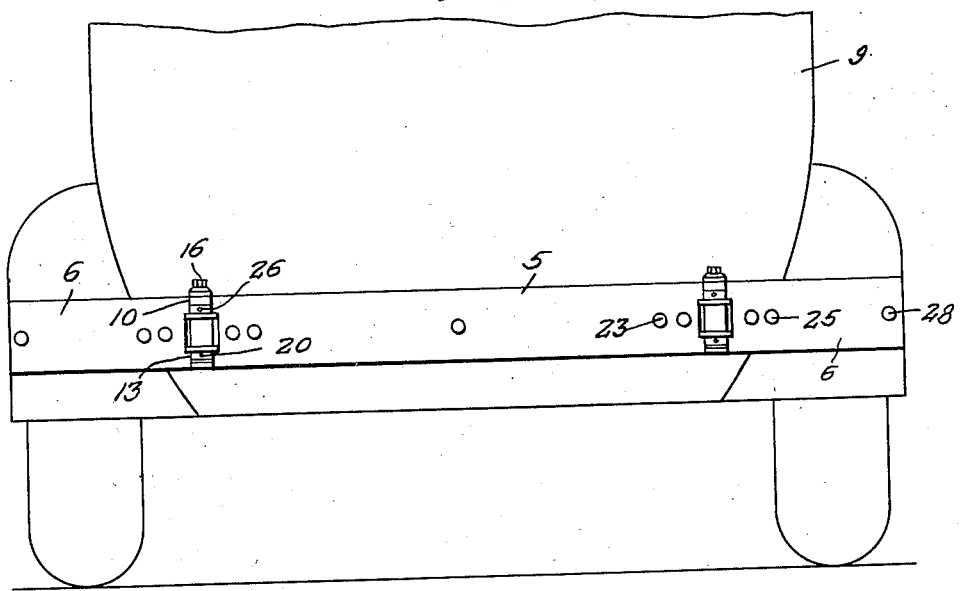
Inventor
Earl L. Daily.
By *Clarence A. O'Brien*
*Hyman Berman*
Attorneys

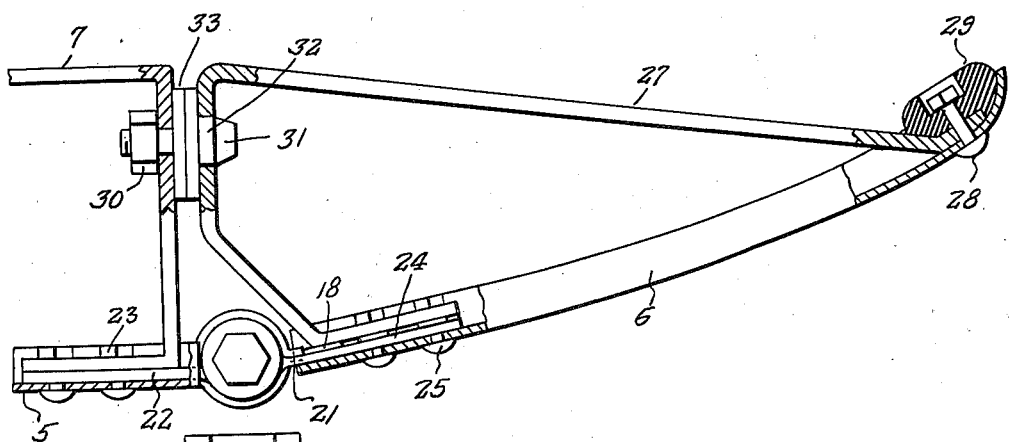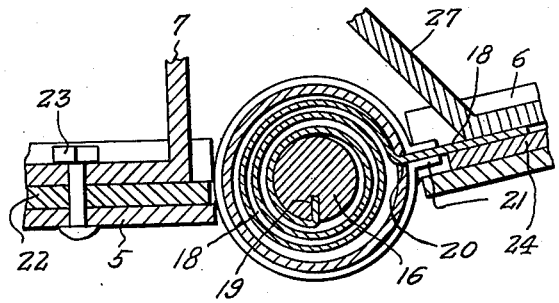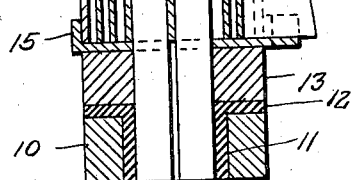

Patented Nov. 2, 1937

2,097,833

UNITED STATES PATENT OFFICE 2,097,833

AUTOMOBILE SAFETY BUMPER

Earl L. Daily, Columbus, Ohio

Application November 16, 1936, Serial No. 111,107

1 Claim. (Cl. 293—55)

This invention relates to bumpers of the type provided at the front or rear or at both ends of an automobile body to protect the body against damage in the event of collision.

An object of the present invention is to provide an automobile bumper having an improved end structure whereby should an end of the bumper become engaged with another bumper or other object the bumper may be readily released without breakage resulting to the bumper.

The invention together with its objects and advantages will be well understood from a study of the following description taken in connection with the accompanying drawings wherein:—

Figure 1 is a plan view of the improved bumper.

Figure 2 is an elevational view thereof.

Figure 3 is a fragmentary detail elevational view of a hinge member associated with an end section of the bumper.

Figure 4 is an enlarged top plan view of an end of a bumper constructed in accordance with the present invention and with certain parts broken away and shown in section.

Figure 5 is an enlarged vertical sectional view taken through the hinge joint between the intermediate and one end section of the bumper.

Figure 6 is a transverse sectional view taken through said hinge joint.

Referring to the drawings by reference numerals it will be seen that in the preferred embodiment thereof, my improved bumper, the same being shown as mounted at the rear of an automobile comprises a main or intermediate bumper section 5 and duplicate end sections 6.

The main bumper section 5 has secured to the rear side thereof intermediate its respective opposite ends one end of angular main spring steel impact bars 7. The bars 7 are suitably secured to mounting bolts 8 which serve to secure the bumper to the automobile body 9.

At one end thereof each end section 6 of the bumper is provided, in a manner hereinafter more fully set out with vertically spaced aperture hinge ears or sleeves 10 that are lined with rubber sleeves or the like 11. The sleeves 11 are provided at one end with flanges 12 which seat on the adjacent end of the hinge lugs or ears 10 as clearly shown in Figure 5.

Also, each end of main bumper section 5 is provided, as hereinafter more fully explained with a pair of spaced apertured hinge ears or lugs 13 that align with the hinge ears or lugs 10 on the end bumper sections 6 as shown in Figure 5.

Interposed between the ears or lugs 13 at each end of section 5 is a tubular housing 14 provided at the top and bottom thereof with caps 15.

Extending through the ears 10 and 13 and through openings provided in the caps 15 are hinge bolts or pintles 16 between the heads of which and the upper ears are disposed washers 17 of rubber or other suitable material.

Housed within each tubular casing 14 is a suitable spring 18 one end of which engages in a longitudinal slot 19 provided therefor in the hinge pin or pintle 16 as clearly shown in Figure 6.

The relatively opposite end of the spring 18 extends through a vertical slot 20 provided in the peripheral wall of the casing 14 with the upper and lower edge of said end of the spring working in channelled lugs 21 that project radially from the caps 15. At the free end thereof each spring 18 is positively engaged with an adjacent bumper section 6 in a manner hereinafter detailed. Thus it will be seen that the springs 18 tend to urge said bumper sections 6 to swing in said one direction and to the position shown in Figure 1.

In connection with the above, it will be noted that the hinge lugs or ears 10 associated with each of the end bumper section 6 are formed integral with a hinge leaf or plate 22 which together with one end of a spring steel impact bar 27 is bolted to the end bumper section 6 adjacent one end of said section 6 as at 25.

Also, the hinge ears or lugs 13 at each end of bumper section 5 are formed integral with a hinge plate or leaf 22 bolted to the inner side of the bumper section 5 at one end of the latter through the medium of bolts 23.

Also, the ears 13 of each hinge leaf 22 are provided with threaded openings to accommodate set screws 26 which are threaded home against the bolt 16 to secure the bolt against rotative movement so that each bumper section 6 will swing relative to a bolt 16 as an axis.

Each bumper section 6 as above mentioned is provided with a steel spring impact bar 27 that has the end thereof bolted thereto through the medium of the bolts 25 with the free end of a spring 18 positioned between the bolted end of bar 27 and the hinge leaf or plate 24 as shown in Figures 4 and 6.

The other end of the impact bar 27 is bolted to the free end of the bumper section 6 as at 28 and the bolt 28 also serves to secure at the inner side of the bumper section 6 at the free end of the latter a protector block 29 of rubber or other suitable material.

For releasably securing each bumper section 6 in proper position with respect to the main bumper section 5, there is provided on each main impact bar 7 adjacent to that end secured to the hinge equipped end of the bumper section 5 what may be termed a pilot bolt 30. Pilot bolt 30 has a free tapered end 31 that cooperates with an opening 32 provided at one end of the adjacent impact bar 27 for guiding said end of the impact bar 27 on to the enlarged cylindrical portion 32 of the bolt 30 upon return movement of an end bumper section 6.

There are also provided on the bolt 30 washers 33 of rubber or other suitable material that serve to space the adjacent end of adjacent impact bars 7 and 27 as shown in Figure 4. From the above, it will be seen that in the event an end section 6 of a bumper becomes hooked with the end of the bumper of another vehicle or with a post or other object, in such a manner as to exert a pull on the bumper section 6 to cause the latter to swing about the pin 16, said bumper section 6 will swing against the action of spring 18 without injury to the bumper. When this pulling force on the bumper section 6 is released, said section will return under action of spring 18 to its normal position which is the position shown in the drawings.

Thus it will be seen that I have provided a bumper, the ends of which are so mounted and equipped as to "give" in response to a force or pull exerted thereon to the end that the end of the bumper so subjected to this force will not be readily broken off.

It is thought that a clear understanding of the construction, utility and advantages of a bumper construction embodying the features of the present invention as herein illustrated and described will be understood and appreciated without a more detailed description thereof.

Having thus described the invention, what is claimed as new is:—

In an automobile bumper, a central section having at one end thereof a pair of vertically aligned hinge lugs, an end section having at one end thereof a similarly disposed pair of hinge lugs between which the hinge lugs of the central section are located, a cylindrical casing having end closure caps and disposed between the lugs of the central section in end engagement therewith, said casing having a slot therein extending throughout the length thereof, a hinge pintle extending through said lugs, caps and casing, and having a longitudinally disposed slot therein co-extensive in length with the casing slot, a convolute spring surrounding said pintle in said casing and co-extensive in width with the length of said casing, said spring having one end anchored in the slot of the pintle and its opposite end extending through the slot in the casing and secured to said end section to thereby tension the latter against rearward swinging movement, and a pair of angle brackets on said sections, respectively, coacting to limit forward swinging movement of said end section under the urge of said spring.

EARL L. DAILY.